US008078673B2

(12) United States Patent
Hines

(10) Patent No.: US 8,078,673 B2
(45) Date of Patent: Dec. 13, 2011

(54) AUTOMATED ACQUISITION AND MAINTENANCE OF WEB-SERVABLE CONTENT VIA ENHANCED "404:NOT FOUND" HANDLER

(75) Inventor: Alan C Hines, Austin, TX (US)

(73) Assignee: Wayport, Inc., Irving, TX (US)

( * ) Notice: Subject to any disclaimer, the term of this patent is extended or adjusted under 35 U.S.C. 154(b) by 965 days.

(21) Appl. No.: 11/835,579

(22) Filed: Aug. 8, 2007

(65) Prior Publication Data

US 2008/0040424 A1 Feb. 14, 2008

Related U.S. Application Data

(60) Provisional application No. 60/821,791, filed on Aug. 8, 2006.

(51) Int. Cl.
*G06F 15/16* (2006.01)
(52) U.S. Cl. ......... 709/203; 709/201; 709/217; 709/219
(58) Field of Classification Search .......... 709/201–203, 709/217, 219
See application file for complete search history.

(56) References Cited

U.S. PATENT DOCUMENTS

| | | | | |
|---|---|---|---|---|
| 6,016,490 A | * | 1/2000 | Watanabe et al. | 1/1 |
| 6,167,438 A | * | 12/2000 | Yates et al. | 709/216 |
| 6,212,564 B1 | * | 4/2001 | Harter et al. | 709/228 |
| 6,212,565 B1 | * | 4/2001 | Gupta | 709/229 |
| 6,442,651 B2 | * | 8/2002 | Crow et al. | 711/118 |
| 6,732,176 B1 | * | 5/2004 | Stewart et al. | 709/227 |
| 7,552,220 B2 | * | 6/2009 | Marmigere et al. | 709/228 |
| 7,912,921 B2 | * | 3/2011 | O'Rourke et al. | 709/219 |
| 2002/0010753 A1 | * | 1/2002 | Matsuoka et al. | 709/217 |
| 2002/0013825 A1 | * | 1/2002 | Freivald et al. | 709/218 |
| 2003/0191858 A1 | * | 10/2003 | Adusumilli | 709/246 |
| 2007/0078978 A1 | * | 4/2007 | Arnold et al. | 709/224 |
| 2009/0240787 A1 | * | 9/2009 | Denny | 709/219 |

* cited by examiner

*Primary Examiner* — Joshua Joo
(74) *Attorney, Agent, or Firm* — Yudell Isidore Ng Russell PLLC

(57) ABSTRACT

A web server in a server network with a centralized administrative and/or content (CAC) server executes a modified "404: Not Found" Handler. When a requested file is present within the web server's temporary storage, the file is retrieved from the temporary directory and provided in response to the request from the requesting client (browser). Also, the web server automatically initiates retrieval of a more current copy of the file from the CAC server. However, when the requested file is not present within the server's temporary directory, the modified handler checks whether the requested file is available for download from the CAC server and retrieves the requested file from the CAC server, rather than issuing the standard 404: Not Found error response. The 404: Not Found error response is only issued when the requested file is not available at both the temporary directory and the CAC server.

4 Claims, 4 Drawing Sheets

AUTOMATED ACQUISITION AND MAINTENANCE OF WEB-SERVABLE CONTENT VIA ENHANCED "404:NOT FOUND" HANDLER

PRIORITY CLAIM

Benefit of priority under 35 U.S.C. §119(e) is claimed based on U.S. Provisional Application No. 60/821,791, filed on Aug. 8, 2006, and titled "Automated Acquisition and Maintenance of Files Comprising Web-Servable Content, Via Customized Handler Of "404:Not Found" Error Conditions Encountered by a Webserver." The content of which is incorporated herein by reference.

RELATED APPLICATION

The present invention is related to the subject matter of commonly-assigned co-pending patent application, having Ser. No. 11/835,587, and titled "Real-Time, Customized Embedding of Specific Content Into Local Webserver Pages." The subject matter of the related application is incorporated herein by reference.

BACKGROUND OF THE INVENTION

1. Field of the Invention

The illustrative embodiment of the present invention relates generally to data communication networks and in particular to web servers within data communications networks. Still more particularly, the present invention relates to providing web-serverable content within data communications networks.

2. Description of the Related Art

A growing number of people now utilize computer networks, such as the Internet, to obtain information hosted at various web servers. This information may be a file or a webpage, which are often accessible via entry by a user of a file request (i.e. file identifying information or a universal resource locator—URL) within a client browser. In order to access the information, however, the user must first connect to the network using a computing device.

With the proliferation of mobile computers and portable personal devices, such as cell phones, PDAs, and the like (all collectively referred to herein as personal computing devices—PCDs), one area of development has been the implementation of server networks accessible via access points—in the form of either wireless access points implementing the 802.11 Wireless Ethernet protocol ("WiFi"), or hardwired Ethernet connection ports—in public and/or private locations (i.e., away from a home or office base). These access points enable a mobile user with a PCD to sign in and access information that may be located on a server of the server network or on the Internet. Each such access via the server network is routed through one of the web servers, which is often connected to the Internet. Also, the web servers are frequently connected to a centralized administrative and/or CAC server that operates as a control and/or monitoring point for the server network.

Companies that provide these server networks and/or access points, such as Wayport, Inc., a Texas corporation, have provided a vast network of such access points and a server network with specific content available at specific servers by user requests. Each of these access points are linked to specific web servers of potentially thousands of web servers interconnected in the server network. The web servers are typically loaded with web-servable content by service provider technical personnel or business partners or customers who desire specific content on specific ones of the web servers. This content is stored in a storage facility, such as a filesytem, associated with the particular web server. Once the user has completed the sign in procedure at the web server, which may entail perusing/interacting with one or more login pages (e.g., "Welcome" or information pages), the user may search for web-servable content (e.g., files) by entering a search term (or request) into the client browser of the user's device.

When a user request is made for retrieval of a file, the web server to which the user's PCD is connected utilizes an internal search function and proceeds to check for the file within the web server's file system. This process utilizes hypertext transfer protocol (HTTP), which is the protocol supported by the web servers, the network, and the Internet. As an integral part of its core specification, HTTP defines a number of "Status Codes" through which a web server communicates its baseline response to any client requesting any particular item of web-servable content from its filesystem. While not specifically defined as part-and-parcel of the HTTP specification, most webserver applications provide the capability to react programmatically to any or all such "Status Codes," internally, at any point (or combination of points) before, during and after the server communicates any response to the requesting client for any specific file. One of the Status Codes defined by the HTTP specification is the HTTP Status Code of "404"—defined by HTTP as meaning that the requested file was "Not Found" on the responding webserver.

With conventional implementation of server network systems, such as that provided by Wayport, this 404: Not found error/status code is triggered whenever the web servable content of the particular web server to which the user device is connected does not include a requested file (e.g., a matching Request-URL) in its file system. However, because of the vast network of servers, each geographically dispersed and custom fitted for different customers or business partners, providing a large array of web-servable content on each server becomes costly. The manpower required to update each of these servers has traditionally also been prohibitive. Updates to the web server and web servable content are typically provided by the network administrator, who may actually have the requested file physically loaded on the specific server.

With the advent of the centralized administrative and/or content (CAC) server, the administrator has been able to push content to specific servers from a single central location. This content is typically stored on the CAC server or an associated database. However, because the local web servers are not designed to host a massive amount of content, the administrator does not load content on a server unless the administrator is made aware that the content is needed. Also, since only certain data is actually required by users of the particular web server, it is difficult for the administrator to determine which content to actually provide to the particular server, unless a request is made. Unfortunately, such requests are only made after a user has received a 404: Not Found error in response to his request for particular content at the web server. Thus, it is not uncommon for a file request to receive a 404:Not found error/status, when the file is not yet loaded by the administrator on that particular web server, even though the requested file may actually be available at the CAC server.

SUMMARY OF THE ILLUSTRATIVE EMBODIMENTS

Disclosed is a method, system and computer program product by which a web server automatically acquires and maintains (i.e., keeps current) web servable content in response to a received request for that content. The conventional "404: Not Found" Handler is modified to complete a series of additional processes to locate a file before issuing a 404: Not Found response to a file request when the file is not initially within the web server's filesystem.

A web server in a server network with a centralized administrative and/or content (CAC) server executes the modified "404: Not Found" Handler. When a requested file is present within the web server's temporary storage, the file is automatically retrieved from the temporary storage and provided in response to the request from the requesting client (browser). Also, the web server automatically retrieves a more current copy of the file from the CAC server. However, when the requested file is not present within the server's temporary storage, the enhanced features of the modified handler are dynamically activated. The modified handler checks whether the requested file is available at the CAC server and retrieves the requested file from the CAC server, rather than issuing the standard 404: Not Found response. The 404: Not Found error response is only issued when the requested file is also not available at the CAC server.

All objects, features, and advantages of the present invention will become apparent in the following detailed written description.

BRIEF DESCRIPTION OF THE DRAWINGS

Illustrative embodiment of the invention are described in the following description with reference to the drawings, in which like numbers represent the same or similar elements, as follows.

This invention is described in a preferred embodiment in the following description with reference to the figures, in which like numbers represent the same or similar elements.

DETAILED DESCRIPTION OF ILLUSTRATIVE EMBODIMENTS

Figure 1:
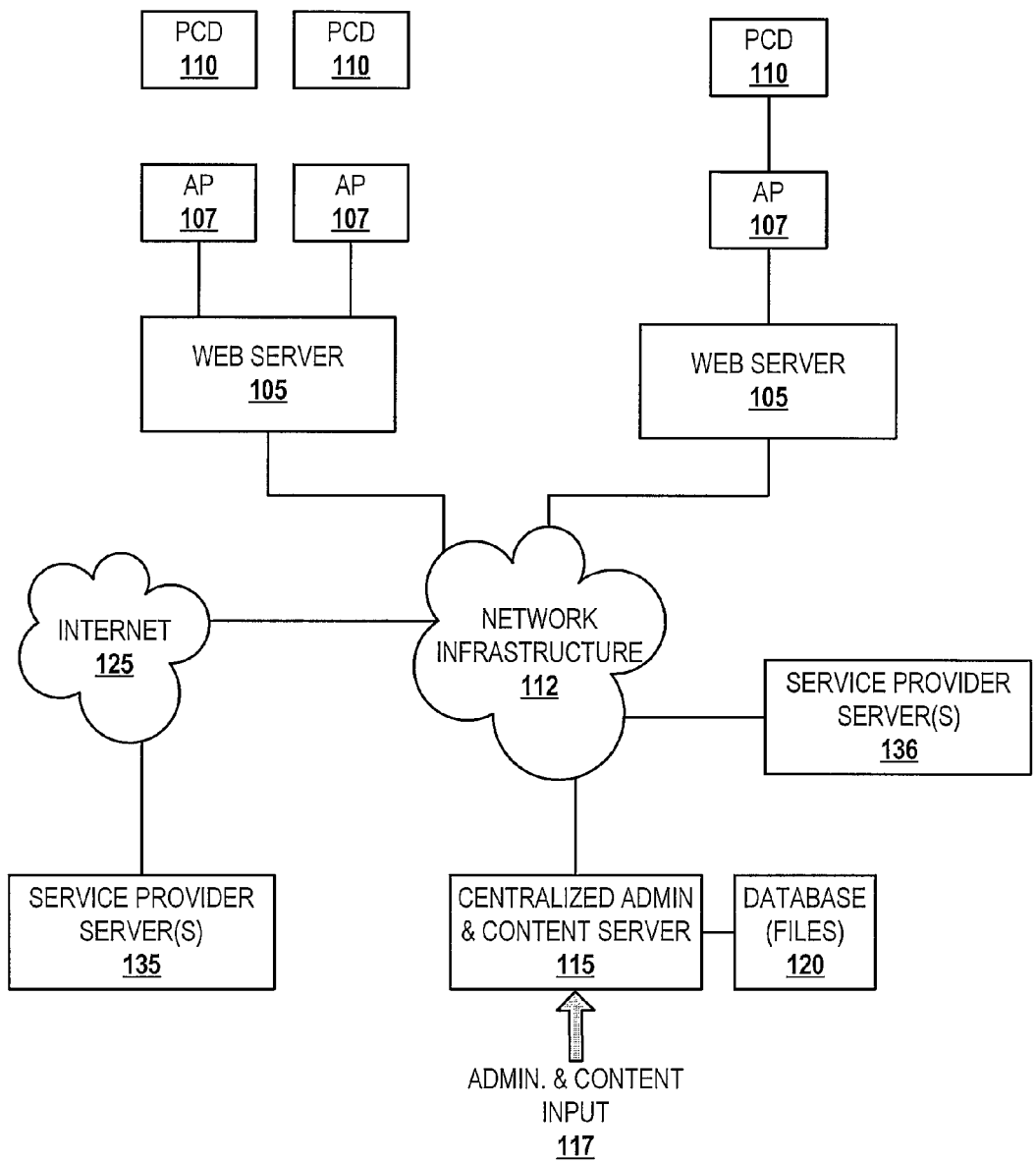
FIG. 1 is an example distributed server network with access points, web servers, and a centralized administrative and/or content (CAC) server, according to one embodiment of the invention.

Generally, the illustrative embodiments provide a method, system and computer program product by which a web server of a server network automatically acquires, and keeps current, files comprising content intended to be displayed by pages of that web server when a user accesses the web server. The conventional "404:Not Found" error generation Handler, utilized to signal a failed HTTP search of a web server, is modified to include second-level search functionality and an automatic file update functionality. The second-level search functionality and automatic file update functionality collectively provides a Server Content Retrieval (SCR) utility, which executes on the web server. The SCR utility enables a web server to respond to a failure to find a requested file (e.g., a web page or static graphic file) in the web server's temporary directory by triggering the second-level search functionality, which generates a request to retrieve the requested file from a remote server within the server network.

Thus one feature provided by the invention comprises responding to a conventional "404: Not Found" error condition by implementing processes to seamlessly and automatically retrieve and display the requested content (or file), when the file is not initially located within the web server's temporary storage. These inventive features of the illustrative and described embodiments provide a method and system for actually locating, acquiring, and storing files that are intended to be served by the web server's own web pages and applications, but which do not actually exist anywhere on that server's file system when initially requested. Another feature of the invention comprises automatically updating the files stored at a web server whenever the file is requested by retrieving a more current/recent version of the file from the remote server.

The illustrative embodiments of the invention address the need for availability of an extensively customizable web interface, to substantially eliminate the difficulties with content distribution across a vast network of servers. With the second-level file search and retrieval and/or the file update/replacement functionalities enabled by the invention (i.e., SCR utility), the web server is now capable of controlling retrieval and/or updates of content that is servable at the web server. Also, the web server substantially reduces the situations in which a request for servable content receives a "404" HTTP error response, even when the file is not in the web server's file system.

In the following detailed description of exemplary embodiments of the invention, specific exemplary embodiments in which the invention may be practiced are described in sufficient detail to enable those skilled in the art to practice the invention. It should be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Figure 2:
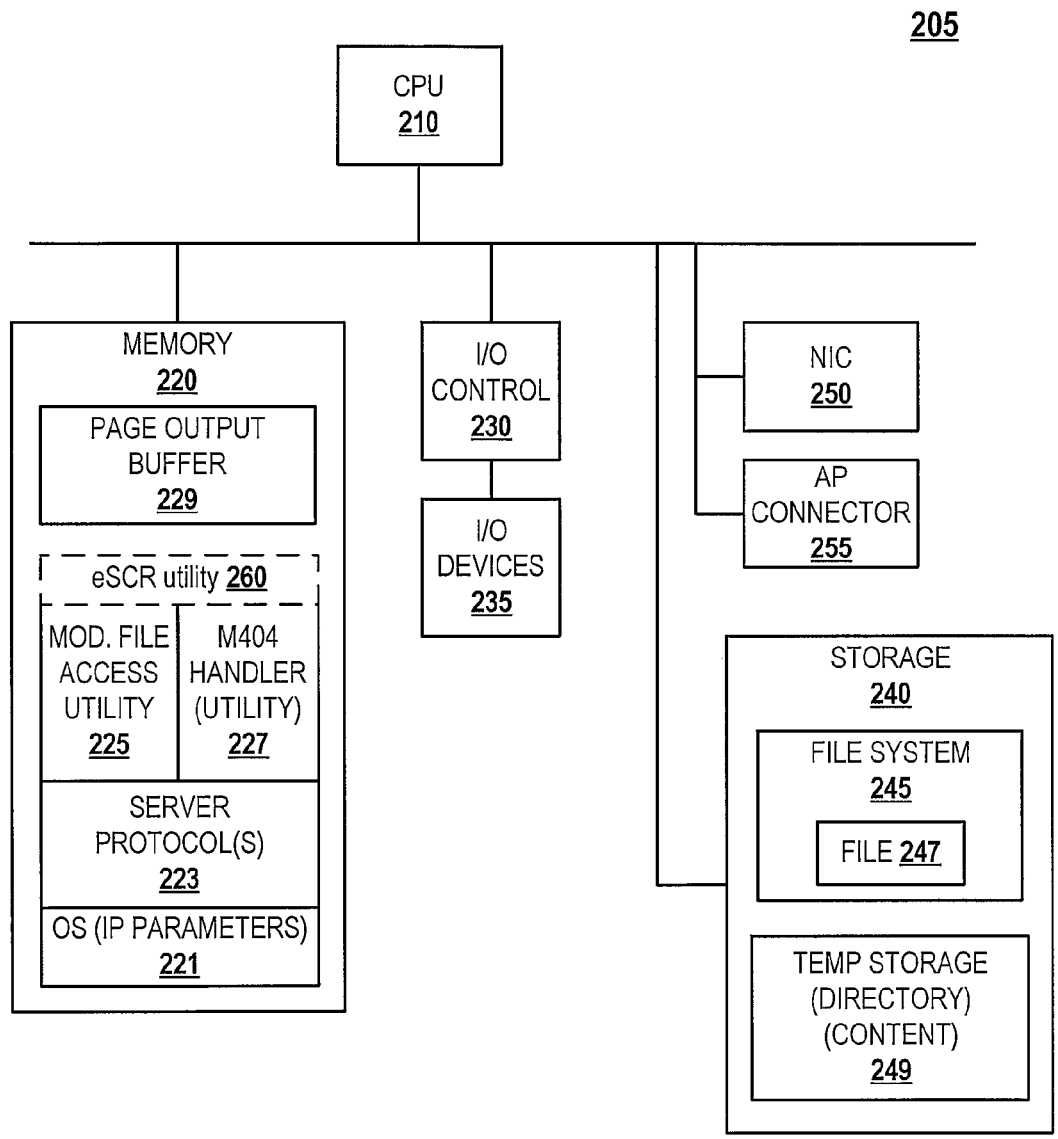
FIG. 2 is an example web server having utilities capable of executing thereon for (a) retrieving and displaying customizable content to users accessing the web server and (b) responding to a 404: not found error condition by retrieving the file from the CAC server, in accordance with embodiments of the invention.

Generally, the features of both concepts is implemented within a web server network environment, such as is illustrated in FIG. 1, with specific features of the SCR utility being provided on an example web server, which is illustrated by FIG. 2.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, FIG. 1 illustrates one embodiment of a distributed network communication system 100. Network system 100 comprises a network backbone (or infrastructure) 112 to which is coupled centralized administrative and content (CAC) server 115, referred to hereinafter as CAC server 115, and a plurality of distributed web servers 105.

Network 100 represents a distributed server system. The network infrastructure 112 may comprise a wired network, a wireless network or a combination of wired and wireless networks. For example, the network infrastructure 112 may be a standard "wired" Ethernet network which connects each of the webservers 105 and by extension each of the wireless (and wired) access points 107 together. Network infrastructure 112 may also be a wireless network based on IEEE 802.11 or other wireless protocol. Network infrastructure 112 is illustrated connected to Internet 125. It is appreciated that network infrastructure 112 may form part of the Internet 125, or may couple to other networks, e.g., other local or wide area networks, such as the Internet 125.

The network communication system 100 may be geographic-based. In other words, the network communication system 100 may provide information and/or services to the user based at least partly on the known geographic location of the user, e.g., as indicated by the access points 107 or as indicated by geographic information (e.g., GPS information) provided from the PCD 110. Notably, while the access points 107 may be specifically located in particular businesses and specific locations, the web servers 105 are not necessarily local to that business and/or locations and may be remote from the location of the access point.

As provided below, CAC server 115 is "centralized" in that CAC server 115 is a single primary source of content data (e.g., files, graphics, web pages, and the like) that may be pushed to or pulled or accessed by any one of web servers 105 across network system 100. Administrative input and content 117 is provided at CAC server 115 and content utilized within network may be stored on CAC server database 120.

Specific content may be provided within specific ones of the web server's file system in a somewhat customizable nature, such that specific servable content at a first web server is different from servable content at a second web server. One method by which customizable web servers are efficiently generated using CAC server with program functionality for granular customization is described in the related application (Ser. No. 11/835,587), which has previously been incorporated herein by reference. As will be described in greater detail below, embodiments of the present invention enables a single point of input for content that may then be distributed in real time to specific webservers 105 within network system 100 when the content is required at that specific webserver 105.

Network system 100 includes one or more access points 107, and preferably a plurality of access points 107. At least a subset of the access points 107 maybe wireless access points (APs) 107 which communicate with a portable computing device (PCD) 110 in a wireless fashion. Each wireless access point (AP) 107 may have a wireless connector or transceiver (e.g., an antenna) and may operate according to various wireless standards, such as wireless Ethernet (IEEE 802.11). One or more of the access points 107 may also be wired access points which communicate with a portable computing device 110 in a wired fashion. The access points (APs) 107 may be widely distributed in various facilities, such as airports, mass-transit stations, shopping malls, restaurants and other businesses, such as business offices, law firm offices, retail stores, and the like.

The portable computing device 110 may be any one of various types of devices, including a computer system, such as a portable computer, a personal digital assistant (PDA), an Internet appliance, a communications device, or other wired or wireless device. The PCD may include one or more wireless or wired communication devices utilized for communicating with a wired access point 107. Examples of these devices include a wireless Ethernet card, paging logic, RF communication logic, a wired Ethernet card, a modem, a DSL device, an ISDN device, an ATM device, a parallel or serial port bus interface, or other type of communication device.

According to the described embodiments of the invention, a user operating a portable computing device (PCD) 110 may communicate with one of the access points 110 to gain access to network services, such as Internet access, or to web servable content hosted at the web server 105.

One or more network providers or general content providers may each have an associated network server 136 coupled directly to the network infrastructure 112 and/or a network server 125 coupled via the Internet 125. These example servers 135, 136 host general content of that service provider, which content is also available to PCDs 110 connected to the servers 105 via an AP 107. As used herein, the term "service provider" (or "network provider") is intended to include various types of service and information providers which may be connected (directly or indirectly) to the network infrastructure 112. Each service provider may include one or more servers 135, 136 configured/programmed to provide various goods, information, and/or services as appropriate for the service provider.

A user operating a portable computing device 110 will typically connect to network system 100 via subscription to one (or more) network providers. Examples of network providers include Wayport, iBahn and AT&T, among others. When the PCD 110 of a user communicates with an AP 107, the respective network provider to which the user is subscribed is determined and the appropriate web server 105 is connected to provide content to that PCD 110.

FIG. 2 illustrates an example data processing system that may operate as one of web server 105. For simplicity, the system is described generally as server 205, and the specific application of functions within server 205 are determined by the software program (code) executing on processors of server 205. As shown, server 205 comprises a central processing unit 210 coupled via system bus (interconnect) 215 to memory 220 and input/output (I/O) controller 230. I/O controller 230 operates as a control point for various input and output devices, generally represented as I/O devices 235. These I/O devices enable an administrator of web server 205 to (locally) load and/or change servable content, stored in persistent storage (240) of server 205.

Also coupled to system bus 215 are network interface controller (NIC) 250 and access point controller (APC) 255. NIC 250 enables server 205 to connect to other devices (e.g., CAC server 115 of FIG. 1) via a network (e.g., network 112 or Internet 125). Depending on implementation, NIC 250 may be a wireless device or wired connection device. APC 255 provides the point of connectivity between server 205 and one or more access points (such as APs 107 of FIG. 1), via one of a wireless or wired connection.

Server 205 also comprises other storage 240, which is illustrated coupled to system bus 215. According to the described embodiments, storage 240 includes thereon a file system (FS) 245, which hosts a plurality of files 247 (such as Welcome pages) that are utilized by server 205 or which may be accessed by a user of a personal computing device (110) connected to server 205 via an access point (107). Storage 240 and, by illustration, file system 245, may be remotely located from server 205 (perhaps accessible via a network), in other embodiments; However, the described embodiments provides for a local file system 245 to simplify the description of the relevant functional features associated with the embodiments.

Storage 240 also includes temporary storage 249, which is a pseudo hardware construct. Temporary storage 249 includes a directory and web servable content. The web servable content is content that is directly accessible by a PCD following a request for that content. During operation, a search for that content first checks the directory of temporary storage to determine whether that content exists within temporary storage 249. With conventional server systems (i.e., prior to the implementation of the various modifications and enhancements described herein), a 404:Not found error was immediately displayed when a requested file was not matched in the directory of temporary storage 249. According to the described embodiments, content loaded onto server 205 from CAC server is stored in temporary storage 249.

In addition to the above described hardware components of server 215, several of the functional features of the invention are provided via software components (i.e., functional program code or utility) executing on CPU 210 of server 205. Thus, as illustrated, located within memory 220 are a number of software components or utilities, including: (a) operating system 221, which provides the Internet Protocol (IP) parameters for network connection and communication; (b) web server protocols 223, which enables data processing system to operate as a web server and communicate with CAC server over network system 100 (FIG. 1); (c) modified file access utility 227, associated with web server protocols 223 and which enables automatic content updates following receipt of a request for the servable content; and (d) Modified "404: Not Found" error response Handler (or MH utility) 229, which responds to a conventional 404 condition by implementing processes by which a requested file (or content) is retrieved from CAC server rather than providing a "404: Not Found" or similar response. Also shown within memory 220 is page output buffer 229, which temporarily holds the contents to be utilized when generating the page that is to be displayed on the user's connected PCD (110).

As introduced above, OS 221 provides the various operational parameters to enable general operation of server 205 as well as the IP (and HTTP) functionality required for network access and transfer of information over the various supported networks. OS 221 in conjunction with web server protocols 223 enable the various processes by which (a) connection is established by a PCD (110) to server 205 via an AP (107) and (b) authentication, login, and other functional features of a web server are provided to support access to servable content and to the background network or the Internet.

In implementation, many of the novel processes supported by the above four software components are provided as a seamless operation via a single execution of code. For simplicity in describing the invention and as an alternate embodiment, the collective body of code that performs the various functions described herein is referred to as Server Content Retrieval (SCR) utility. References to SCR utility (or execution thereof) thus cover the entire range of functions provided by the illustrative embodiments, which occur at the web server 205.

The SCR utility 260 executes on CPU 210 and provides a series of functional processes, which are illustrated and described below within the description of the flowcharts. Generally, SCR utility provides the method functions of: (1) detecting when a requested file is not present within the servers file system; (2) initiating a check of the associated temporary storage (directory) to locate the requested file; (3) when the file is located, updating the local copy of the requested file with a more current version requested from the CAC server; (4) forwarding the request to the CAC server to retrieve the requested file, when not located at the web server; and (5) signaling a 404: Not found error condition only after the above series of checks at the local server and the CAC server fails to yield a copy of the requested file. Other functions are also supported as described within the flow charts.

According to the described embodiments, the CAC server (115) is modified to provide certain responses to certain requests received from connected web servers 105/205. Among these responses are: (1) providing a date and time value of the copy of the requested file at the CAC server; (2) automatically forwarding the copy of the file to the requesting server upon request from the requesting server; directly servicing a file request to the PCD initiating the file. CAC server may also provide additional functions, as described herein and/or within the related patent application.

Figure 3:
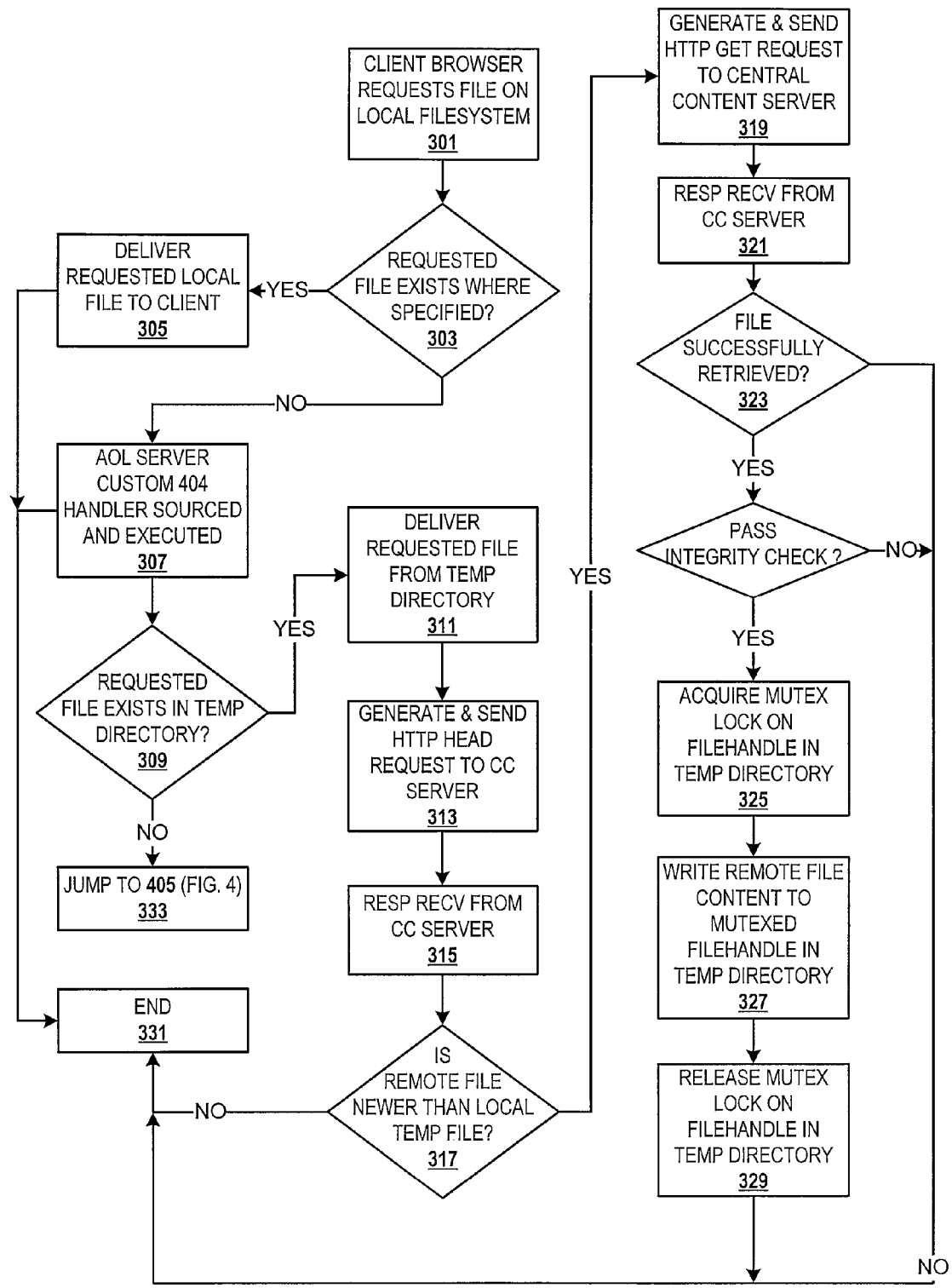
FIG. 3 is a flow chart illustrating the method by which the enhanced Server Content Retrieval (eSCR) utility, executing on an example web server, responds to locating a requested file by triggering an update of the local file copy to a more current copy obtained from the CAC server, in accordance with one embodiment of the present invention.
Figure 4:
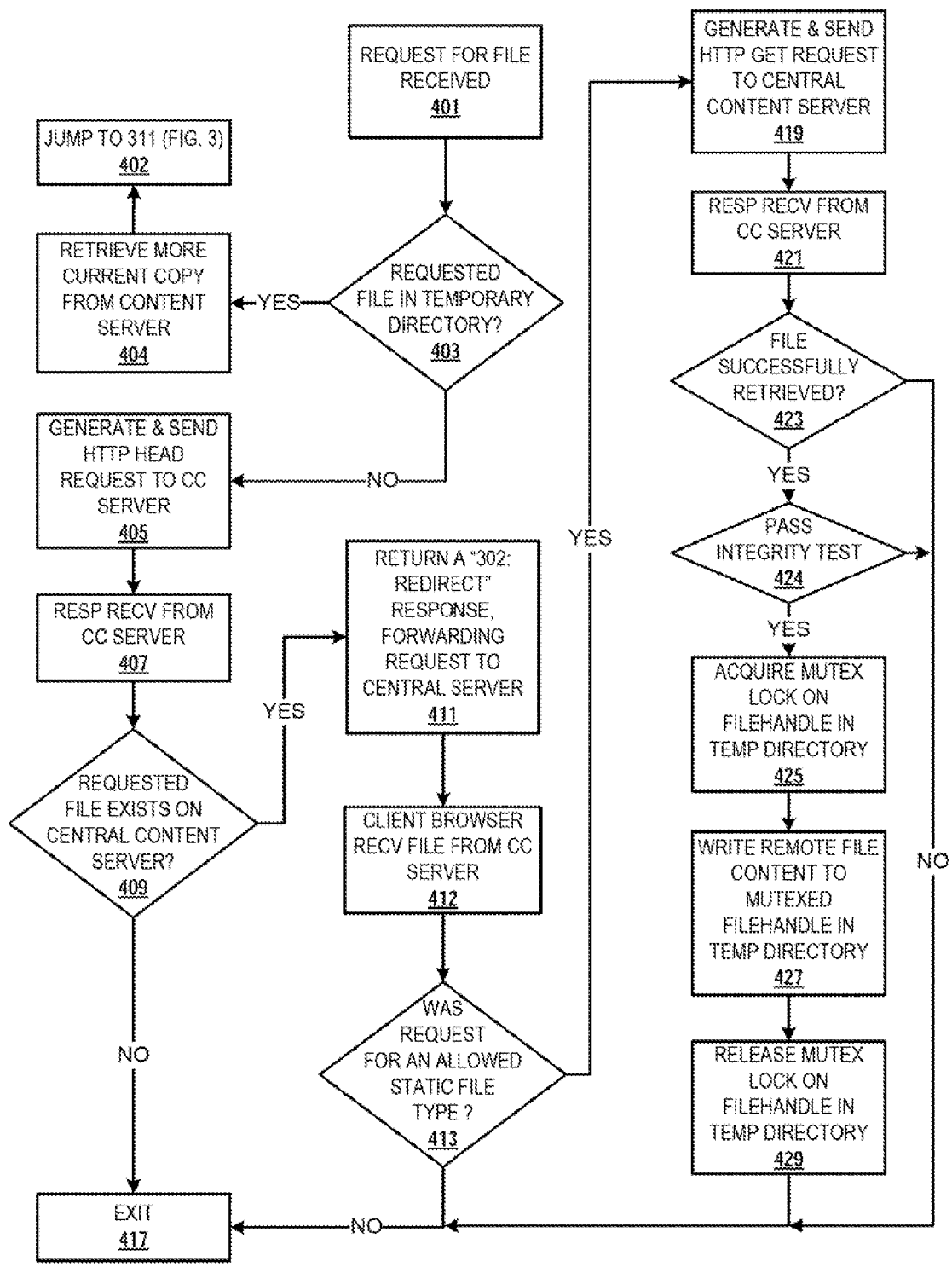
FIG. 4 is a flow chart illustrating the method by which the modified 404 Handler features of the SCR utility responds to a failure to locate a requested file by dynamically requesting the file from the CAC server, in accordance with one embodiment of the present invention.

Turning now to the flow charts, FIG. 3 is a flowchart illustrating the method by which the SCR utility, executing on the web server, responds to a received request for a file by automatically updating the file with a more current copy downloaded/retrieved from a centralized CAC server, according to one embodiment. FIG. 4 is a flowchart illustrating the method by which the SCR utility, executing on the web server, responds to a received request for a file that is not available within the web server's file system, according to one embodiment. Although the methods illustrated in FIGS. 3 and 4 may be described with reference to components shown in FIGS. 1-2, it should be understood that this is merely for convenience and alternative components and/or configurations thereof can be employed when implementing the method.

The method of FIG. 3 begins at block 301 at which a request is received from a client browser for access to a file. The request may originate from a client browser opened on a client device (e.g., a PCD) that connects to the server via an AP (107). At decision block 303, the SCR utility checks whether the requested file exists at the standard/specified location (e.g., within the file system). If the file exists at the standard/specified location, the requested file is delivered to the client from that location as shown at block 305, and the process ends at termination block 331. However, if the file does not exist at the specified location, SCR utility activates modified (M) 404 Handler features (utility), as shown at block 307. In the illustrative embodiment, AolServer Custom 404 Handler, which is represented herein as M404 Handler, is sourced and executed. Again, for simplicity, the features specific to M404 Handler are generally described as being completed by SCR utility.

At decision block 309, SCR utility checks whether the requested file exists at the web server's temporary directory. If no matching file is found, as provided at block 333, the process jumps to block 405 of FIG. 4, described below. If a matching file is found at/in the web server's temporary directory, the matching file residing in the temporary directory is returned to the requestor (PCD or client browser) as the server's HTTP response to the request, as provided at block 311. Then, as provided at block 313, web server (or SCR utility) generates and transmits a query to CAC server, (or other central location on the network) at which servable content, such as the requested file, is stored.

The request is transmitted as a web (or Internet) request to the CAC server. The transmitted request includes the HTTP HEAD and in a first embodiment, a request for a return of the "last-modified-date" value of the copy/version of the file at the CAC server (i.e., a file specified with the same filename and path as the original file request received from the client browser, which, on the original web server, had resulted in, first, a "404: Not Found" condition, and then the service of that file from the web server's temporary directory). In an alternate embodiment, the request includes the timestamp of the local web server copy of the file and a request for an updated copy to be transmitted to the web server if the "last-modified-date" value of the file copy stored at the CAC server is more current than the timestamp.

At the CAC server side of the process, the CAC server receives the request, and provides one or two responses, depending on which embodiment is implemented. With the second embodiment, (not specifically illustrated by the flow chart), the CAC server compares the timestamp with the "last-modified-date" value of the copy at the CAC server. Then, if the file copy on the CAC server is more current/recent than the copy at the web server, the CAC server provides its copy of the file as a response to the request from the web server.

Returning to the flow chart, when the request is for the "last-modified-date" value, a response is received from the CAC server, as shown at block 315. Then, as shown at block 317, SCR utility determines whether the file on the CAC server is more current (or newer) than the copy of the file in the web server's temporary storage. In one embodiment, CAC server transmits the "last-modified-date" value in response to the web server request, and the "last-modified-date" value is then compared to the timestamp of the local copy of the file, to determine whether a more current version of the file exists. If the last-modified-date value shows that the file on the CAC server is not newer (or perhaps if the file is not substantially newer—greater than a few minutes, for example) than the copy of the file at the web server, then no file update is required and the process ends.

However, if the last-modified-date value indicates that the file copy on the CAC server is substantially newer than the copy stored in the web server's temporary directory, the CAC copy of the file is requested from the CAC server, by the inquiring web server. Specifically, the web server generates and transmits a HTTP GET Request to the CAC server, as shown at block 319. The request is again transmitted via as a web request. A response is to the request received at the web server, as provided at block 321. The SCR utility checks, at block 323, whether the file copy was successfully received. If the file was successfully received, SCR utility implements one or more processes to check the integrity of the file's data, as shown at block 324. The integrity check includes a check that the "content-length" of the data retrieved from the CAC server is the same as the length reported by that CAC server for that file. Assuming that the data-integrity checks all succeed, the retrieved file is then stored within the web server's temporary storage (directory) via a series of steps (325-329), which involves replacing the version/copy of the file that had previously been in the temporary directory.

At block 325, the content updating features of SCR utility acquires the MUTEX lock on the FileHandle in the temporary directory. The SCR utility writes the remote file content to the MUTEXed FileHandle in the temporary directory, at block 327. Then, the SCR utility releases the MUTEX lock on the FileHandle, as shown at block 329. The process then ends at terminator block 331.

Turning now to FIG. 4, the illustrated sequence generally involves the automated acquisition of content via a modified "404: Not Found" handler. The process begins at block 401 at which the file request is received at the web server. At decision block 403, a check is made whether the requested file is located in the server's temporary directory. If a matching file is found in the web server's temporary directory, the SCR utility initiates a process to retrieve a more current copy of the file from the CAC server, as shown at block 404. As provided at block 402, the process jumps to block 311 of FIG. 3, by which a more current copy of the file is retrieved from the CAC server, as described above. However, if no matching file is located in the web server's temporary directory, the web server (eSCR utility) generates and transmits a request to the CAC server, where such files are typically stored, as shown at block 405. In the illustrative embodiment, the query is transmitted as a HTTP HEAD request, and includes information to enable identification of a file that matches the same filename and path as the original file request received from the client browser.

At block 407, a response is received to the web server's request. A check of the CAC server or database is made to determine whether the requested file exists at the CAC server. If, as determined at decision block 409, the requested file is found on the CAC server, the SCR utility returns a "302: Redirect" response to the client browser, which causes the file request (or client browser) to be automatically redirected to the CAC server to process the file request, as shown at block 411. The client browser (or other content acquisition application) retrieves the file directly from the CAC server in a seamless manner, as shown at block 412, rather than receiving a "404: Not Found" error from the web server.

A determination is made at block 413, whether the file request was for an allowed static file type. If the file request was not for an allowed static file type, the process ends, at block 417. However, if the file request was for an allowed static file type, then the web server generates and transmits a HTTP GET request to the CAC server, as shown at block 419, and the GET request is transmitted to the CAC server as a web request. In another embodiment, described below, the HTTP GET request is transmitted as the initial and perhaps the only query, and includes information to enable retrieval of the file specified with the same filename and path as the original file request received from the client browser, if the file exists at the CAC server.

The CAC server responds to a GET request by forwarding the requested file to the requesting web server. The SCR utility receives a response to the GET request (i.e., transmitted by the CAC server, using HTTP), as shown at block 421, and the SCR utility determines at block 423 if the requested file was successfully retrieved from the control server. If the file is not successfully retrieved, the SCR utility may trigger an IIS or HTTP response to a failed GET request, and the process terminates at block 417.

When the file is successfully received, the file is checked for the integrity of its data, as shown at block 424. This integrity checking process was described above (FIG. 3). Then, assuming that the data-integrity checks succeed, the file is then stored within the web server's temporary directory via a series of steps (blocks 425-429), which were described above with reference to FIG. 3 (blocks 325-329). Any subsequent request for the file at that web server will thus be successful, as the copied file will be stored at the temporary directory and presented to the client browser in response to the subsequent requests for the file.

In one alternate embodiment, no integrity check is performed as the file is retrieved directly from the trusted CAC server. However, this embodiment may lead to a less reliable outcome when the download itself has introduced errors in the file data implementation of this alternate embodiment may be performed on a case by case basis, as programmed within the specific web server.

Returning to block 409, if the requested file does not exist on the CAC server, the SCR utility then triggers the standard "404:Not Found" (or similar) response, which is provided to the client browser. This response is thus only provided after the SCR utility has exhausted its search for the file both within the local temporary directory and file system and within the CAC server.

By specifically updating the files at the CAC server, a content provider for the web servers is able to efficiently provide updated content to the users of the numerous, dispersed web servers without having to physically load that content on each web server. The web servers that do not have updated content or a copy of the content are automatically provided the content when the page is requested by a user logging into or accessing the network via the web server.

The above description provides exemplary embodiments for implementing the novel features of the invention. Alternate embodiments are also possible, including variations of and modifications to the above described illustrative embodiments. In one alternate implementation, when the file does not exist in the web server's temporary directory but does exist on the central CAC server, rather than redirecting the client's request and retrieve the requested file from a central CAC server, the web server (SCR utility) could instead immediately copy the requested file from the CAC server, store the file within the web server's temporary directory, and then serve that local copy of the file to the requesting client/user/application.

In another embodiment, rather than immediately serving the local copy of a file from the web server's temporary directory, and subsequently checking the "last modified date" value of the copy at the CAC server, the web server may first check the "last modified date" value of the file copy at the CAC server. Then, if the copy at the CAC server is newer than the version stored on the temporary directory, the web server may then redirect the request to that CAC server or copy the requested file from the CAC server to the web server's temporary directory before serving the file to the client/user/application.

In yet another embodiment, instead of providing an "responsive" capability that keeps the locally cached files current only when a requested file is served from the web server's temporary directory, the web server may be programmed/designed to execute/run an automatic update procedure, on a periodic schedule. With the automatic update procedure, the web server would periodically check the "last modified date" values of the versions of the files located at the CAC server for each file residing in the web server's temporary directory. The web server would then retrieve any more current versions of the locally stored files found at the CAC server via a targeted GET operation.

Finally, in one alternate embodiment, the local web server is made to effectively proxy to the requesting client/user any file found on the CAC server but which is not stored on the local file system or temporary directory. The web server would then write the same bitstream to its temporary directory after the user's request has been fulfilled.

The above described and illustrative embodiments provide several advantages over the standard 404: Not Found Handler. Among these advantages are: (1) the illustrative embodiments provide many of the benefits of a fully-centralized web application, while maintaining those of the current de-centralized architecture. The invention enables content and functions to be changed at any time, while the network overhead remains minimized by serving binary and static content from the local webserver filesystem; (2) All temporary/cached files are always and automatically kept current, allowing continual modifications of any distributed content, by simply updating the files that are stored on the centralized CAC servers; (3) Managerial overhead is virtually eliminated, because these is no need to develop, qualify and deploy a large number of packages containing the files and/or the program logic necessary to display any particular content, to any number of field web servers where such content is intended to be displayed. Instead, any such files only need to be placed upon the centralized CAC server, and can then be retrieved upon demand from a user in the field whose browser requests that content; and (4) There is no noticeable or measurable impact on the processing capabilities of the field web servers because the entire system is merely a modification to the same web server process that ordinarily serves pages to users connecting through the network controlled by any particular web server.

Thus, the SCR utility prevents the user from receiving the 404: Not Found error response, even though the file is not initially present at the web server's local directory or at the web server's file system. The SCR utility thus provides a response to those files that do not exist on: (a) that web server's file system, (b) where specified in the HTML code of any web page, or (c) where otherwise requested by any mechanism intended to request, acquire and/or display content from that web server, over an HTTP connection.

In the flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the methods' steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, include recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

While the invention has been particularly shown and described with reference to a preferred embodiment, it will be understood by those skilled in the art that various changes in form and detail may be made therein without departing from the spirit and scope of the invention.

What is claimed is:

1. A system comprising:
   a plurality of servers coupled to a network;
   a first plurality of access points configured to communicate with a first plurality of computing devices and coupled to a first server of the plurality of servers; and
   a second plurality of access points configured to communicate with a second plurality of computing devices and coupled to a second server of the plurality of servers;
   wherein the first server includes a first processor and a first memory medium coupled to the first processor;
   wherein the second server includes a second processor and a second memory medium coupled to the second processor;
   wherein the first memory medium includes instructions, which when executed by the first processor, cause the first server to perform:
      receiving a first request for first content from a first computing device of the first plurality of computing devices;
      searching a first file system to find the first content;
      determining that the first content is not found within the first file system;
      searching a first temporary directory to find the first content;
      determining that the first content is not found within the first temporary directory;
      transmitting a request identifying the first content to a third server when the first content is not found in the first file system and the first temporary directory;
      receiving a response from the third server indicating whether the first content exists on the third server;
      sending a response to the first computing device indicating that the first content is not found when the response indicates that the first content does not exist on the third server;
      redirecting, based on the first request for the first content, the first computing device of the first plurality of computing devices to the third server of the plurality of servers when the response indicates that the first content exists on the third server;
      retrieving the first content from the third server;
      storing the first content in a first locally-accessible storage configured to store the first file system and the first temporary directory;
      receiving a second request for the first content from a second computing device of the first plurality of computing devices;
      searching the first file system to find the first content;
      determining whether or not the first content is found within the first file system;
      if the first content is found within the first file system, sending the first content from the file system to the second computing device of the first plurality of computing devices; and
      if the first content is not found within the first file system:
         searching the first temporary directory to find the first content;
         determining that the first content is found within the first temporary directory; and
         sending the first content from the first temporary directory to the second computing device of the first plurality of computing devices;
   wherein the second memory medium includes instructions, which when executed by the second processor, cause the second server to perform:
      receiving a third request for second content from a first computing device of the second plurality of computing devices;
      searching a second file system to find the second content;
      determining that the second content is not found within the second file system;
      searching a second temporary directory to find the a second content;
      determining that the second content is not found within the second temporary directory;
      transmitting a request identifying the second content to the third server when the second content is not found in the second file system and the second temporary directory;
      receiving a response from the third server indicating whether second first content exists on the third server;
      sending a response to the first computing device of the second plurality of computing devices indicating that the second content is not found when the response indicates that the second content does not exist on the third server;
      redirecting, based on the request for the second content, the first computing device of the second plurality of computing devices to the third server when the response indicates that the second content exists on the third server;
      retrieving the second content from the third server;
      storing the second content in a second locally-accessible storage configured to store the second file system and the second temporary directory;

receiving a fourth request for the second content from a second computing device of the second plurality of computing devices;
searching the second file system to find the second content;
determining whether or not the second content is found within the second file system;
if the second content is found within the second file system, sending the second content from the second file system to the second computing device of the second plurality of computing devices;
if the second content is not found within the second file system:
  searching the second temporary directory to find the second content;
  determining that the second content is found within the second temporary directory; and
  sending the second content from the second temporary directory to the second computing device of the second plurality of computing devices.

2. The system of claim 1,
wherein the first content is based on a first geographic location;
wherein second content is based on a second geographic location that is different from the first geographic location;
wherein the second content is different from the first content; and
wherein the first memory medium further includes instructions, which when executed by the first processor, cause the first server to perform:
  receiving first geographic location information from the first computing device of the first plurality of computing devices, wherein the first geographic location information indicates the first geographic location;
  receiving second geographic location information from a third computing device of the first plurality of computing devices, wherein the second geographic location information indicates the second geographic location;
  receiving a third request for the second content from the third computing device of the first plurality of computing devices;
  searching the first file system to find the second content;
  determining whether or not the second content is not found within the first file system;
  if the second content is found within the first file system, sending the second content from the first file system to the third computing device of the first plurality of computing devices; and
  if the second content is not found within the first file system:
    searching the first temporary directory to find the second content;
    determining whether or not the second content is not found within the first temporary directory;
    if the second content is found within the first temporary directory, sending the second content from the first temporary directory to the third computing device of the first plurality of computing devices; and
    if the second content is not found within the first temporary directory:
      redirecting, based on the third request for the second content, the third computing device of the first plurality of computing devices to the third server.

3. The system of claim 1, wherein at least one of the first plurality of access points is a wireless access point configured to wirelessly communicate with at least one of the first plurality of computing devices.

4. The system of claim 1, wherein at least one of the first plurality of computing devices is a portable computing device.

* * * * *